(12) United States Patent
Shih et al.

(10) Patent No.: US 10,530,790 B2
(45) Date of Patent: Jan. 7, 2020

(54) PRIVILEGED SESSION ANALYTICS

(71) Applicant: Oracle International Corporation, Redwood Shores, CA (US)

(72) Inventors: Kuang-Yu Shih, Fremont, CA (US); Himanshu Sharma, Berkeley, CA (US); Fannie Ho, Fremont, CA (US); Zhuoxing Mao, Fremont, CA (US); Sudhir Kumar Srinivasan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 111 days.

(21) Appl. No.: 14/862,906

(22) Filed: Sep. 23, 2015

(65) Prior Publication Data
US 2016/0094577 A1 Mar. 31, 2016

Related U.S. Application Data

(60) Provisional application No. 62/055,421, filed on Sep. 25, 2014.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC .......... *H04L 63/1425* (2013.01); *H04L 63/10* (2013.01)

(58) Field of Classification Search
CPC ........................... H04L 63/1425; H04L 63/10
See application file for complete search history.

(56) References Cited

U.S. PATENT DOCUMENTS

| | | | | |
|---|---|---|---|---|
| 8,141,138 | B2 * | 3/2012 | Bhatia ................... | G06F 21/552 726/28 |
| 9,185,095 | B1 * | 11/2015 | Moritz .................. | H04L 63/102 |

(Continued)

OTHER PUBLICATIONS

U.S. Appl. No. 14/819,970, Final Office Action dated Jul. 26, 2018, 16 pages.

(Continued)

*Primary Examiner* — Lynn D Feild
*Assistant Examiner* — Vadim Savenkov
(74) *Attorney, Agent, or Firm* — Kilpatrick Townsend & Stockton LLP

(57) ABSTRACT

A privileged account manager is provided for monitoring privileged sessions on target systems of an enterprise. In an embodiment, the privileged account manager is configured to capture metadata related to a privileged session and generate a first activity pattern for the privileged session based on the captured metadata. The first activity pattern may include a sequence of one or more activities performed by a first user during the privileged session. The privileged account manager may be configured to identify a second activity pattern that comprises at least a subset of the one or more activities performed by the first user during the privileged session and determine an appropriate action to be performed for the first activity pattern based on the identification of the second activity pattern. In some embodiments, the privileged account manager may be configured to transmit the action to a second user on a client device.

20 Claims, 10 Drawing Sheets

(56) References Cited

U.S. PATENT DOCUMENTS

| | | | |
|---|---|---|---|
| 9,547,839 B2* | 1/2017 | Luo | G06Q 10/10 |
| 2004/0039704 A1 | 2/2004 | Gilliam et al. | |
| 2004/0083389 A1* | 4/2004 | Yoshida | G06F 11/3495 |
| | | | 726/22 |
| 2005/0138420 A1 | 6/2005 | Sampathkumar et al. | |
| 2005/0203881 A1* | 9/2005 | Sakamoto | G06F 21/552 |
| 2006/0129587 A1* | 6/2006 | Renfro | G06F 21/604 |
| 2007/0074289 A1* | 3/2007 | Maddaloni | G06F 21/566 |
| | | | 726/23 |
| 2007/0083915 A1 | 4/2007 | Janakiraman et al. | |
| 2007/0255818 A1* | 11/2007 | Tanzer | G06F 21/552 |
| | | | 709/224 |
| 2008/0306872 A1 | 12/2008 | Felsher | |
| 2009/0076995 A1* | 3/2009 | Uyama | G06Q 30/02 |
| | | | 706/46 |
| 2009/0293121 A1* | 11/2009 | Bigus | G06F 21/316 |
| | | | 726/22 |
| 2010/0082513 A1* | 4/2010 | Liu | H04L 63/1458 |
| | | | 706/46 |
| 2010/0125911 A1* | 5/2010 | Bhaskaran | G06Q 10/10 |
| | | | 726/23 |
| 2010/0146622 A1* | 6/2010 | Nordstrom | G06F 21/554 |
| | | | 726/23 |
| 2010/0257580 A1* | 10/2010 | Zhao | H04L 12/2602 |
| | | | 726/1 |
| 2010/0299292 A1* | 11/2010 | Collazo | G06F 21/577 |
| | | | 706/14 |
| 2011/0023115 A1* | 1/2011 | Wright | G06F 21/552 |
| | | | 726/22 |
| 2011/0296001 A1* | 12/2011 | Ramstrom | G06F 21/31 |
| | | | 709/224 |
| 2011/0296003 A1* | 12/2011 | McCann | G06F 21/316 |
| | | | 709/224 |
| 2012/0017281 A1* | 1/2012 | Banerjee | G06F 21/00 |
| | | | 726/25 |
| 2012/0036245 A1 | 2/2012 | Dare et al. | |
| 2012/0036440 A1 | 2/2012 | Dare et al. | |
| 2012/0036552 A1 | 2/2012 | Dare et al. | |
| 2012/0260339 A1* | 10/2012 | Bhogal | G06F 21/552 |
| | | | 726/23 |
| 2013/0086060 A1* | 4/2013 | Donley | G06F 21/45 |
| | | | 707/736 |
| 2013/0298186 A1* | 11/2013 | Radkowski | G06F 17/00 |
| | | | 726/1 |
| 2014/0040638 A1 | 2/2014 | Barton et al. | |
| 2014/0075492 A1 | 3/2014 | Kapadia et al. | |
| 2014/0095894 A1 | 4/2014 | Barton et al. | |
| 2014/0096186 A1 | 4/2014 | Barton et al. | |
| 2014/0108558 A1 | 4/2014 | Borzycki et al. | |
| 2014/0129268 A1 | 5/2014 | B'Far et al. | |
| 2014/0201806 A1* | 7/2014 | Kumar | H04L 63/1416 |
| | | | 726/1 |
| 2014/0282568 A1 | 9/2014 | Peckham | |
| 2014/0282586 A1 | 9/2014 | Shear et al. | |
| 2014/0337528 A1 | 11/2014 | Barton et al. | |
| 2015/0113600 A1* | 4/2015 | Dulkin | H04L 63/102 |
| | | | 726/4 |
| 2015/0121461 A1* | 4/2015 | Dulkin | H04L 63/1408 |
| | | | 726/4 |
| 2015/0180894 A1* | 6/2015 | Sadovsky | G06F 3/0481 |
| | | | 726/22 |
| 2015/0200821 A1* | 7/2015 | Sade | H04L 67/28 |
| | | | 709/224 |
| 2015/0261955 A1* | 9/2015 | Huang | G06F 21/562 |
| | | | 726/23 |
| 2015/0373049 A1* | 12/2015 | Sharma | H04L 63/20 |
| | | | 726/22 |
| 2016/0092802 A1 | 3/2016 | Theebaprakasam et al. | |
| 2016/0226914 A1* | 8/2016 | Doddy | G06F 21/45 |
| 2016/0234198 A1* | 8/2016 | Breiman | H04L 63/0815 |

OTHER PUBLICATIONS

U.S. Appl. No. 14/819,970, Non-Final Office Action dated Feb. 13, 2018, 13 pages.
U.S. Appl. No. 14/819,970, Non-Final Office Action dated Feb. 14, 2019, 16 pages.
U.S. Appl. No. 14/819,970, Notice of Allowance dated Jul. 17, 2019, 11 pages.
Desmond "Delegating Privileges in Active Directory," ITProToday, available at https://www.itprotoday.com/active-directory/delegating-privileges-active-directory, Jan. 14, 2011, pp. 1-12.

* cited by examiner

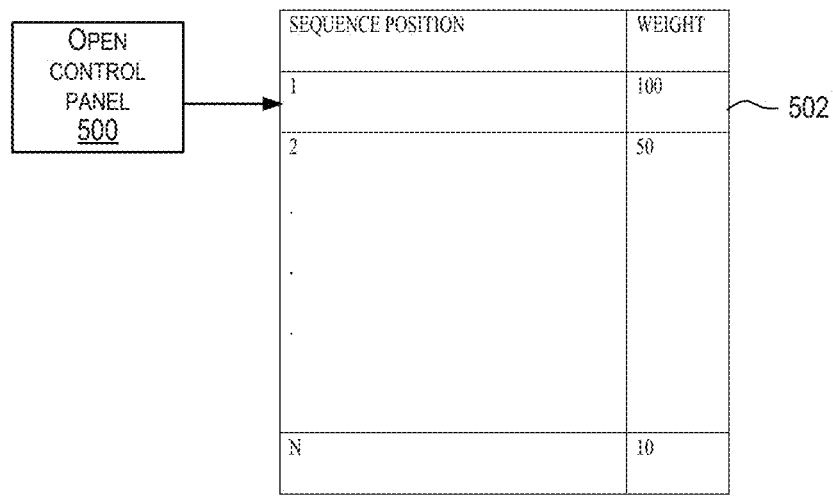
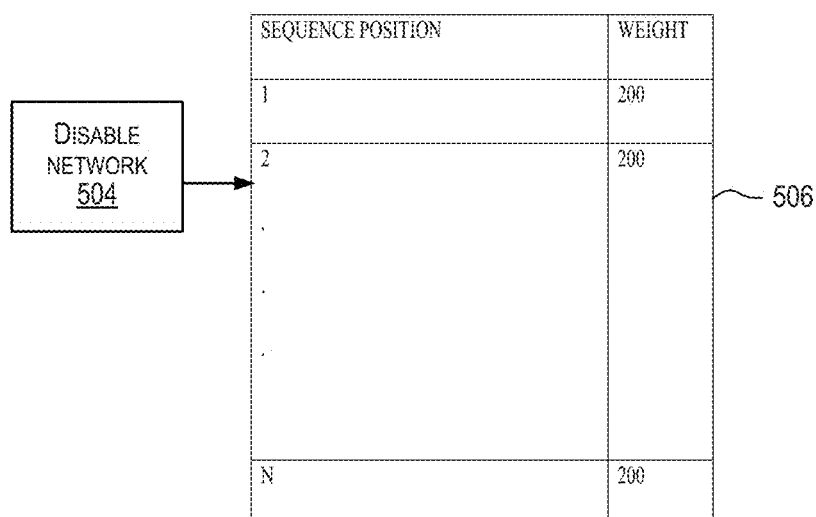
FIG. 5

PRIVILEGED SESSION ANALYTICS

CROSS-REFERENCES TO RELATED APPLICATIONS

The present application is a non-provisional application of and claims the benefit and priority under 35 U.S.C. 119(e) of U.S. Provisional Application No. 62/055,421, filed Sep. 25, 2014 entitled "PRIVILEGED SESSION ANALYTICS," the entire contents of which are incorporated herein by reference for all purposes.

BACKGROUND OF THE INVENTION

Modern computing systems often utilize multiple privileged accounts for providing secure access to computing resources within an enterprise. Resources may include, for example, software products, applications (e.g., cloud-based applications, enterprise applications, or any other applications), cloud services, various types of data (e.g., networked files, directory information, databases, or the like) and other resources.

Privileged accounts generally refer to accounts that have the ability to either access sensitive data and/or grant access to this sensitive data to users of an enterprise. A privileged session may refer to a secure session that is created between a user and a target system of an enterprise after the user obtains access to a privileged account. Privileged accounts are oftentimes lucrative targets for internal and external attacks within an enterprise. Additionally, as the number of resources utilized by an enterprise and/or organization increase, detecting inappropriate access to these accounts becomes a challenge. As such, finding improved ways to manage privileged accounts and privileged sessions continues to be a priority.

BRIEF SUMMARY OF THE INVENTION

In certain embodiments, techniques are provided (e.g., a method, a system, non-transitory computer-readable medium storing code or instructions executable by one or more processors) for monitoring privileged sessions on target systems of an organization. As used herein, target systems can include, but are not limited to, software products, applications (e.g., cloud-based applications, enterprise applications, or any other applications), cloud services, various types of data (e.g., networked files, directory information, databases, or the like), and other resources. In some embodiments, target systems may include one or more databases, lightweight directory access protocol (LDAP) servers, Active Directory (AD) systems, Email Systems, UNIX systems and the like. For example, a target system may be an Active Directory (AD) system that provides access to active directory services to access an Active Directory server.

In certain embodiments, a privileged account manager that is capable of managing privileged accounts and privileged sessions on target systems is disclosed. In an embodiment, the privileged account manager may be configured to receive session information associated with a privileged session and capture metadata related to the privileged session based on the session information. Metadata may include, for instance, application information, system information, network activity information, textual information, visual information, audio information and the like related to the privileged session. The privileged account manager may then be configured to generate a first activity pattern for the privileged session based on the captured metadata. In some examples, the first activity pattern may include a sequence of one or more activities performed by a user during the privileged session.

In some examples, the privileged account manager may be configured to determine a weight to be assigned to an activity of the one or more activities performed by the user during the privileged session. For instance, the weight may be determined based on a position of occurrence of the activity in the sequence of the one or more activities comprising the first activity pattern. In other instances, the weight assigned to an activity may be determined based on a threat level associated with the activity.

In certain embodiments, the privileged account manager may then be configured to identify, from a set of stored activity patterns, a second activity pattern that comprises at least a subset of the one or more activities performed by the user during the privileged session. In some examples, the second activity pattern may be determined by identifying a longest matching subsequence of one or more activities between the first activity pattern and the second activity pattern.

In certain embodiments, the privileged account manager may then be configured to determine an action to be performed for the first activity pattern based on the identification of the second activity pattern and transmit an action to a second user on a client device. Exemplary actions for an activity pattern may include, "Warn User," "Warn Admin," "Logout User," "Reboot Machine," "Quarantine machine," "Take no action," and the like. In some examples, the privileged account manager may also be configured to transmit information related to the first activity pattern to the second user.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 5 shows an exemplary illustration of a table of weights associated with activities of an activity pattern in a privileged session, in accordance with an embodiment of the present invention.

DETAILED DESCRIPTION OF THE INVENTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Techniques described herein disclose a method and system for monitoring privileged sessions on target systems of an enterprise and/or organization. In an embodiment, a privileged account manager is disclosed. The privileged account manager may be configured to receive a request to access a privileged account stored on a target system from a user and provide access to the privileged account to the user on the target system. The privileged account manager may then be configured to establish a secure, privileged session between a client device of the user and the target system.

In some embodiments, the privileged account manager may be configured to capture metadata related to a privileged session and generate an activity pattern for the privileged session based on the captured metadata. The activity pattern may represent a sequence of activities (e.g., open control panel, open remote machine, edit registry, open port and the like) performed by the user during the privileged session. In some embodiments, the privileged account manager may then be configured to analyze the activity pattern. The analysis of the activity pattern may include assigning a weight to each activity in the sequence of activities of the activity pattern. In some examples, the weight assigned to an activity may be determined based on the position of its occurrence in the sequence. In other examples, the weight assigned to an activity may be determined based on a threat level associated with the activity. After assigning weights as discussed above, in certain embodiments, the privileged account manager may be configured to identify an activity pattern from a set of stored activity pattern that best matches the given activity pattern and determine an appropriate action to be taken for the given activity pattern based on the identified stored activity pattern. In some embodiments, the privileged account manager may then be configured to transmit the action to an administrator of the organization. In some examples, the administrator may view the appropriate action and information related to the activity pattern via a browser application on the administrator's client device.

Figure 1:
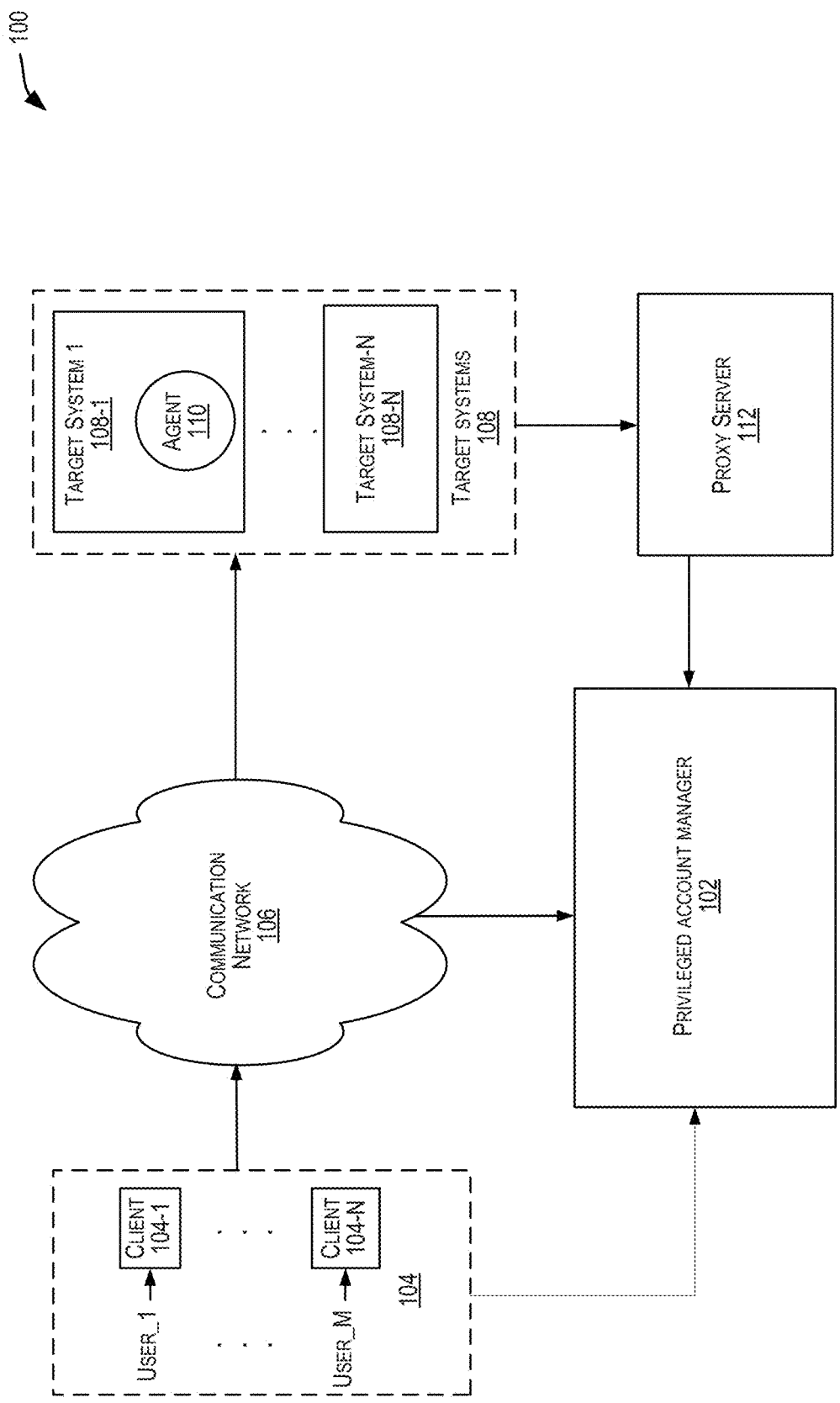
FIG. 1 illustrates an example block diagram of a computing environment 100 in accordance with certain embodiments of the present invention.

FIG. 1 illustrates an example block diagram of a computing environment 100 in accordance with certain embodiments of the present invention. As shown, computing environment 100 includes one or more clients 104(1)-104(N) (collectively, clients 104) communicatively coupled to a privileged account manager 102 via a communication network 106. An exemplary privileged account manager 102 includes the Oracle Privileged Account Manager (OPAM) available by Oracle® Corporation. Privileged account manager 102 is also communicatively coupled with one or more target systems such as target systems 108(1) . . . 108(N) (collectively, target systems 108) using communication network 106. The embodiment depicted in FIG. 1 is merely an example and is not intended to unduly limit the claimed embodiments of the present invention. One of ordinary skill in the art would recognize many variations, alternatives, and modifications. For example, there may be more or fewer client devices than those shown in FIG. 1.

Clients 104 may include client devices, which may be of various different types, including, but not limited to, a personal computer, a desktop, a mobile or handheld device such as a laptop, a mobile phone, a tablet, etc., and other types of devices. Clients 104 may also include programs or applications executing on client devices. For example, a client 104 may be a web browser, a proprietary client application, or some other application executing on client devices.

Communication network 106 facilitates communications between one or more clients 104 and privileged account manager 102. Communication network 106 can be of various types and can include one or more communication networks. For example, communication network 106 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as WebSockets that provide a full-duplex communication channel over a single TCP connection, IEEE 802.XX suite of protocols, TCP/IP, IPX, SAN, AppleTalk, Bluetooth, and other protocols. In general, communication network 106 may include any communication network or infrastructure that facilitates communications between one or more clients such as clients 104, target systems 108 and privileged account manager 102.

In certain embodiments, privileged account manager 102 is a server that is capable of managing privileged accounts and privileged sessions on target systems 108. As used herein, a privileged account may include one that relies on a password to receive access to the target systems and/or one that may be accessed via a secure session. For instance, a privileged account may refer to a root account in a UNIX system or a system account in a database system that can be shared by users. A secure session, described herein may refer to a privileged session (e.g., a gateway, proxy, bridge, or mediator between the client and the target system) to access protected resources on the target systems.

In some embodiments, target systems 108 may be remote systems, which have privileged accounts managed by privileged account manager 102. Privileged account manager 102 can manage different types of privileged sessions on target systems 108. For example, these privileged sessions can include Microsoft Windows® sessions, Linux® X11 sessions, virtual network computing (VNC) sessions, Mac® OS X remote desktop sessions, and the like.

In certain embodiments, an agent 110 can be deployed on target system (e.g., 108(1)) for monitoring one or more privileged sessions on the target system. In some embodiments, and as will be discussed in greater detail below, agent 110 may record user activities within a privileged session and communicate the user activities to privileged account manager 10. Agent 110 may be implemented using software, hardware or a combination thereof.

In accordance with some embodiments, agent 110 can be physically deployed on target systems 108. Agent 110 may utilize a graphical user interface (GUI) rendering system on the target system to obtain, for instance, session information related to a privileged session. Session information may include application information, textual information, visual information, and the like related to a privileged session. In some embodiments, agent 110 may communicate with privileged account manager 102 using a secure channel, e.g. based on secure shell (SSH)/transport layer security (TLS) protocols.

In some embodiments, privileged account manager 102 can take advantage of a proxy server 112, which can monitor and record privileged sessions on target systems 108. For example, proxy server 112 can be used to collect session information on the different target systems such as application information, textual information (e.g. commands and key strokes), visual information (e.g. the graphical display and windows) and the like.

The use of proxy server 112 in accordance with an embodiment of the present invention can be beneficial, in terms of alleviating the life-cycle burden in maintaining different versions of the same software on a large number of servers, devices, and platforms, since the proxy server does not have to solely rely on an agent (e.g., 110) that is deployed physically on any target system (e.g., 108(1)).

In certain embodiments, agent 110 and proxy server 112 can monitor one or more privileged sessions on target systems 108 simultaneously. For instance, agent 110 can be deployed on a sensitive system (e.g. target system 108(1)), which is also monitored by proxy server 112. However, when agent 110 is physically deployed on target system 108(1), agent 110 can closely monitor the different user activities and can potentially collect more information than proxy server 112.

In some embodiments, a user (e.g., an administrative entity) of an organization can connect to privileged account manager 102 and perform various management tasks, such as view, search and audit recorded privileged sessions, in order to prevent inappropriate access to various accounts and to detect unauthorized activities. As used herein, an administrative entity may include one or more administrators of the organization. Additional details of the operation of the privileged account manager is discussed below in relation to FIGS. 2-8.

In some embodiments, privileged account manager 102 may comprise one or more computers and/or servers which may be general purpose computers, specialized server computers (including, by way of example, PC servers, UNIX servers, mid-range servers, mainframe computers, rack-mounted servers, etc.), server farms, server clusters, or any other appropriate arrangement and/or combination. The computing devices that make up privileged account manager system 102 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, Sybase, IBM and the like.

In certain embodiments, target systems 108 may include one or more databases, lightweight directory access protocol (LDAP) servers, Active Directory (AD) systems, Email Systems, UNIX systems and the like. For example, a target system may be an Active Directory (AD) system that provides access to active directory services to access an Active Directory server. In some examples, a target system may be a computing system that provides access to a meeting room, such as access to the meeting room using a badge. In some embodiments, a target system may also be referred to as an application instance. Target systems may also include various types of software products, applications (e.g., cloud-based applications, enterprise applications, or any other applications), cloud services, various types of data (e.g., networked files, directory information, databases, or the like), and other resources.

In some embodiments, a target system may also provide resources. The resources provided by a target system may be one of various resource types, including, but not limited to, a software resource, a hardware resource, a data resource, a service, an application, a physical object, a place, a computing resource, and the like. A hardware resource may include, without limitation, servers, data storage devices, servers, printers, or the like. A software resource may include, without limitation, a computing program, an application (e.g., cloud-based applications, enterprise applications, or any other applications), a computer-program product (e.g., software), a service (e.g., cloud-based services), or the like. A data resource may include, without limitation, any accessible data objects such as a file (e.g., a networked file or directory information), a database, and the like.

In some embodiments, access to resources provided by a target system may be controlled using various types of accounts in the target system. For instance, such an account may include a privileged account as discussed above. An account may be provisioned in a target system based upon the resources provided by the target system. An account may be of various types such as privileged accounts, user accounts, administrative accounts, application accounts, and the like, with each account type providing a particular level of access to one or more resources provided by the target system. Separate accounts (e.g., user accounts, administrative accounts, and/or application accounts) may be provided in a target system to enable a user entity (e.g., an end-user, administrator) to access or otherwise log into the target system. An account may be created, or provisioned, to a user entity or a group of users (e.g., an organization) based on the identity of the user or the group of users. A user entity or a group of users may be provided with a particular account type to access a particular resource type. For instance, an e-mail account on an Exchange server provided to a user entity may be an account of a resource type Exchange.

A user entity may be given multiple accounts, each corresponding to an account type for a resource type. For example, a user entity may have two different accounts for logging into a target system to perform different types of operations. For example, a target system may host an Email exchange server and provide an email account type. The same target system may also host an HR system and provide an HR administrator account type for performing administrative functions related to the HR system. A particular user entity may have an email account on the target system and also have an HR administrative account on the target system. When logged in using the email account, the user entity may access emails. When logged in using the HR administrative account, the user entity can perform administrative tasks related to managing resources in an organization.

Figure 2:
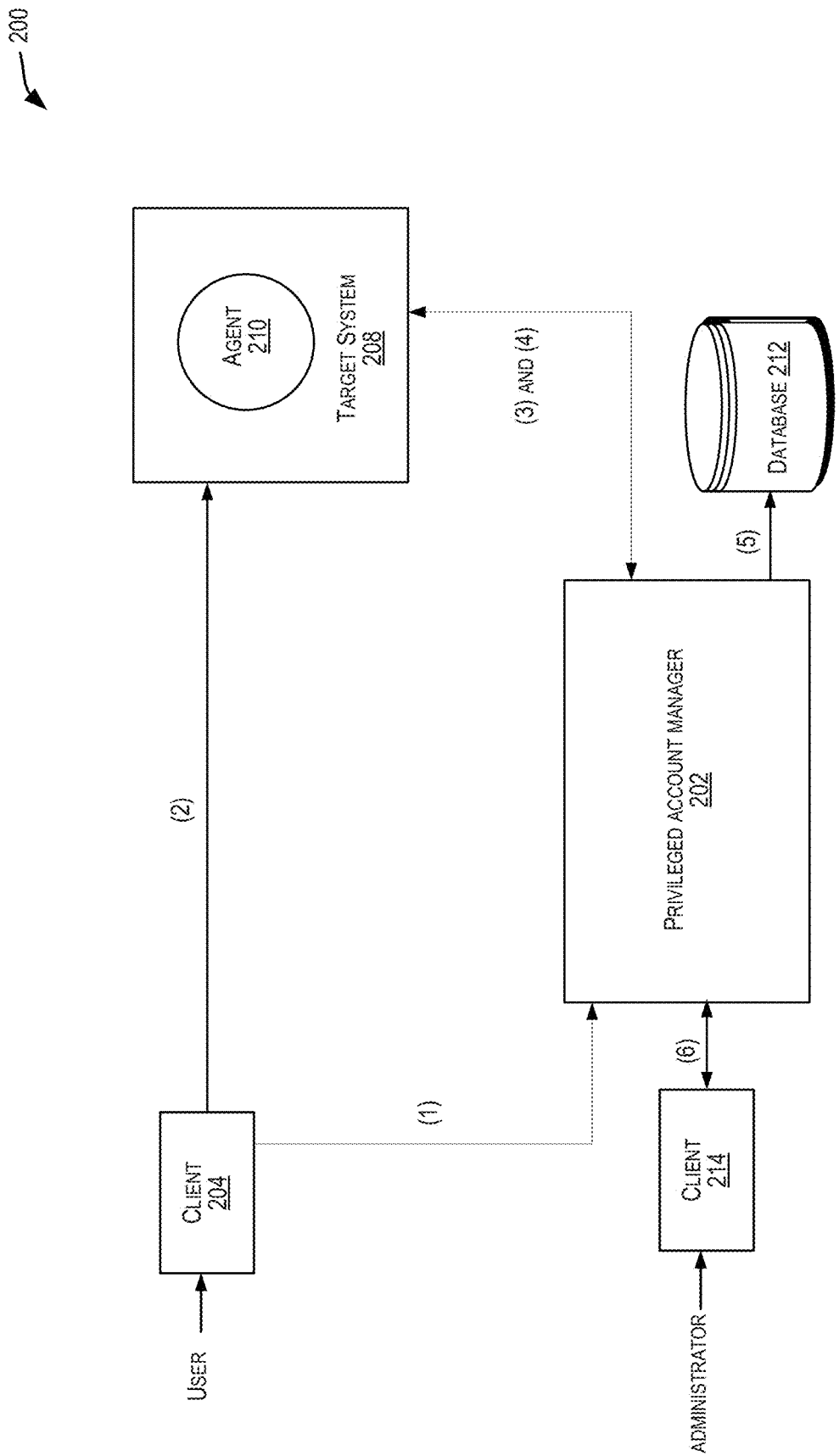
FIG. 2 shows an illustration of the manner in which a privileged session can be monitored by the privileged account manager in a computing environment 200, in accordance with an embodiment of the present invention.

FIG. 2 shows an illustration of the manner in which a privileged session can be monitored by the privileged account manager in a computing environment 200, in accordance with an embodiment of the present invention. In the embodiment shown in FIG. 2, privileged account manager 202 may perform the monitoring of a privileged session on target system 208. Privileged account manager 202 and target system 208 may be the same or similar as privileged account manager 102 and target system 108 discussed in FIG. 1.

At step 1, a user on client 204 connects to privileged account manager 202 (i.e. the server) via a communication network (e.g., 106 shown in FIG. 1) and sends a request to privileged account manager 202 for obtaining access to a privileged account on target system 208. Client 202 may be the same or similar to client 102 discussed in FIG. 1. Upon receiving a request for accessing a privileged account from the user, privileged account manager 202 may provide the user with a password or a session. The user may then access the privileged account based on the received one-time password or direct session.

At step 2, the user connects to target system 208 to establish a privileged session after obtaining access to the privileged account. A privileged session may start as soon as a user logs into the privileged account on target system 208, using the password or session provided by privileged account manager 202. In certain situations, the access to the privileged account may not be available after the user logs out from the privileged account on target system 208. The privileged session may end as soon as the user logs out from the privileged account, at which time the user relinquishes the user's right to access the privileged account and another user is allowed to log in the privileged account.

At step 3, an agent 210 running on target system 208, after detecting the establishment of a privileged session, can communicate with privileged account manager 202 to obtain policy and/or configuration information associated with privileged account manager 202. In some embodiments, agent 210 may capture metadata associated with the privileged session. Metadata may include, for instance, application, textual, visual and audio data related to a privileged session. Additional details regarding the types of metadata captured by agent 210 is discussed in FIG. 3.

At step 4, agent 210 may transmit the metadata to privileged account manager 202.

At step 5, privileged account manager 202 can store the metadata related to the privileged session in a database 212. In some embodiments, and as will be discussed in detail in FIG. 3, privileged account manager may be configured to determine an activity pattern related to the privileged session based on the captured metadata. Privileged account manager may then be configured to analyze the activity pattern to detect unauthorized activity and/or inappropriate access to the privileged session. In some examples, privileged account manager 202 may be configured to determine an action to be taken for the privileged session based upon the analyzed activity pattern.

At step 6, a user (e.g., an administrator) of the organization can connect to privileged account manager 202 via client 214 in order to view the captured metadata related to the privileged session. In some embodiments, the user may view activity patterns associated with the privileged session augmented with the captured metadata, view the actions to be taken for the privileged session based upon the analyzed activity pattern, and so on.

In some examples, the administrator can review a recorded privileged session, which may be a completed privileged session after the user has already logged off. In other examples, the administrator may review an ongoing privileged session when a user is still using the session. In the case of reviewing an ongoing session, the administrator may view the session in real time while the session is ongoing in a fashion similar to a live record-replay.

Figure 3:
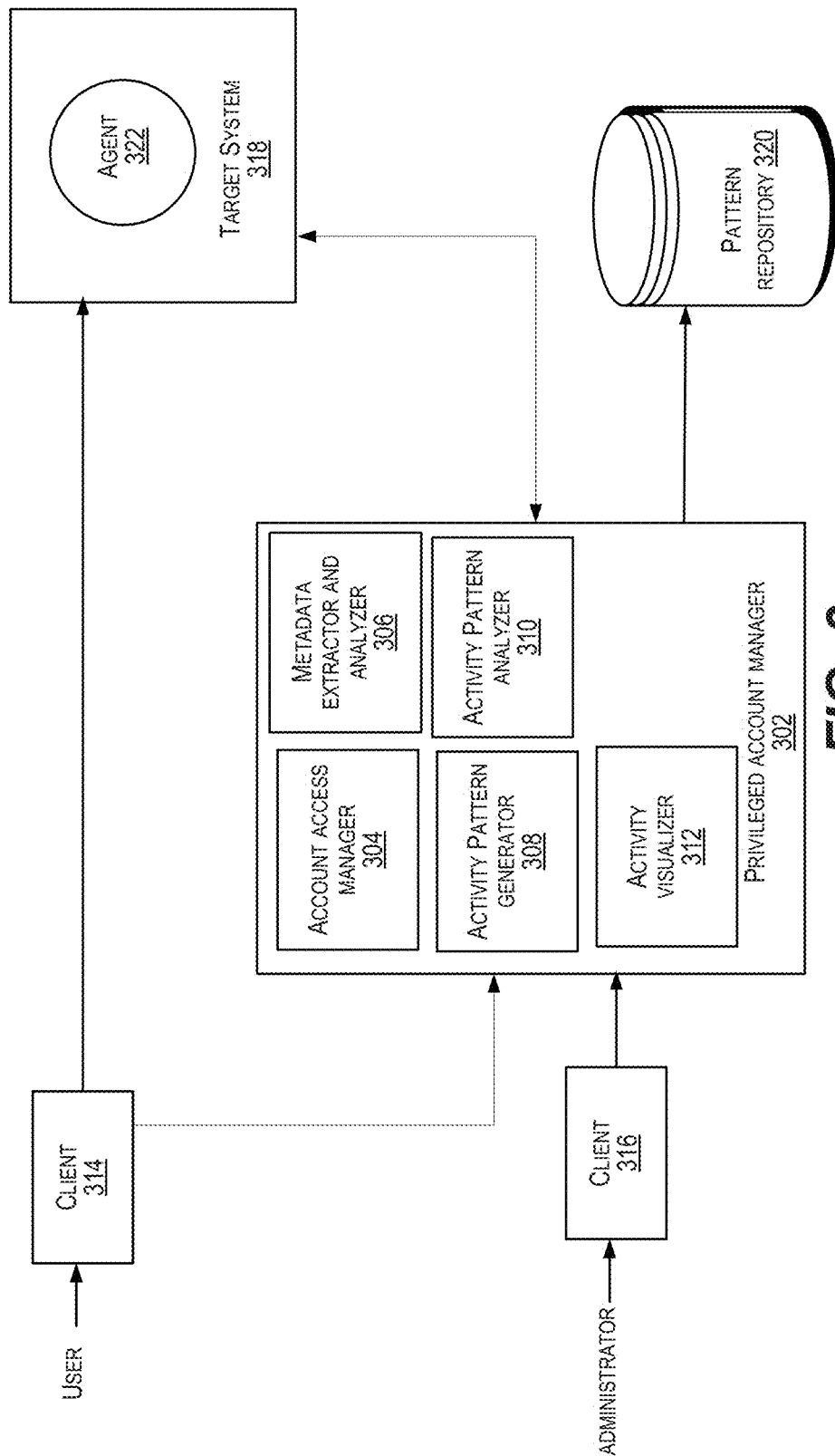
FIG. 3 illustrates an example block diagram of the privileged account manager in accordance with certain embodiments of the present invention.

FIG. 3 illustrates an example block diagram of the privileged account manager in accordance with certain embodiments of the present invention. In one embodiment, privileged account manager 302 may include an account access manager 304, a metadata extractor and analyzer 306, activity pattern generator 308, activity pattern analyzer 310 and activity visualizer 312. The embodiment depicted in FIG. 3 is merely an example of a privileged account manager and is not intended to unduly limit the claimed embodiments of the present invention. One of ordinary skill in the art would recognize many variations, alternatives, and modifications. For example, privileged account manager 302 may include more or fewer components than those shown in FIG. 3. These components may be implemented using hardware, software or a combination thereof.

In certain embodiments, account access manager 304 may be configured to manage log-in credentials for one or more privileged accounts of target system 308. For instance, when a user of client 314 wishes to access target system 318 (e.g., via a communication network, 106), account access manager 304 may check out an appropriate password to the user. The user may then utilize the checked out password to log in to the target system. Upon successfully logging the user into an account in the target system, in some embodiments, account access manager 304 may be configured to initiate a secure privileged session between the client and the target system. The logged in user may then utilize the privileged session (e.g., a gateway, proxy, bridge, or mediator between the client and the target system) to access protected resources on the target system.

In certain embodiments, metadata extractor and analyzer 306 may be configured to capture metadata related to the privileged session. Metadata may include, for example, contextual information related to the privileged session. For example, metadata may include information about applications utilized by the user during the privileged session. For instance, application information may include window titles, application executable names, textual activity within the application, position of the application on the screen, and the like. Metadata may also include local system information and network activity information. For instance, local system information may include information such as CPU usage, memory usage, open file handles and the like associated with the user's client. Network activity information may include information related to remote systems accessed by the user's client, applications accessing the network, open ports on the client, bandwidth usage and the like. In some examples, metadata may include audio information, textual information such as text typed during the privileged session, visual information such as screen captures, and the like.

In some embodiments, the captured metadata may be augmented with policy information associated with the privileged account manager. Policy information may include, for instance, information about session activities or activity footprints that may be considered sensitive activities. For instance, a session activity that continuously uses high bandwidth may be considered a sensitive activity. In some embodiments, such metadata may be tagged with a sensitivity tag or score. Session activity may be analyzed using captured metadata for the privileged session to detect ongoing malicious activities and prevent them in the future. Metadata may also be used to perform forensic analysis into past privileged sessions.

Figure 4:
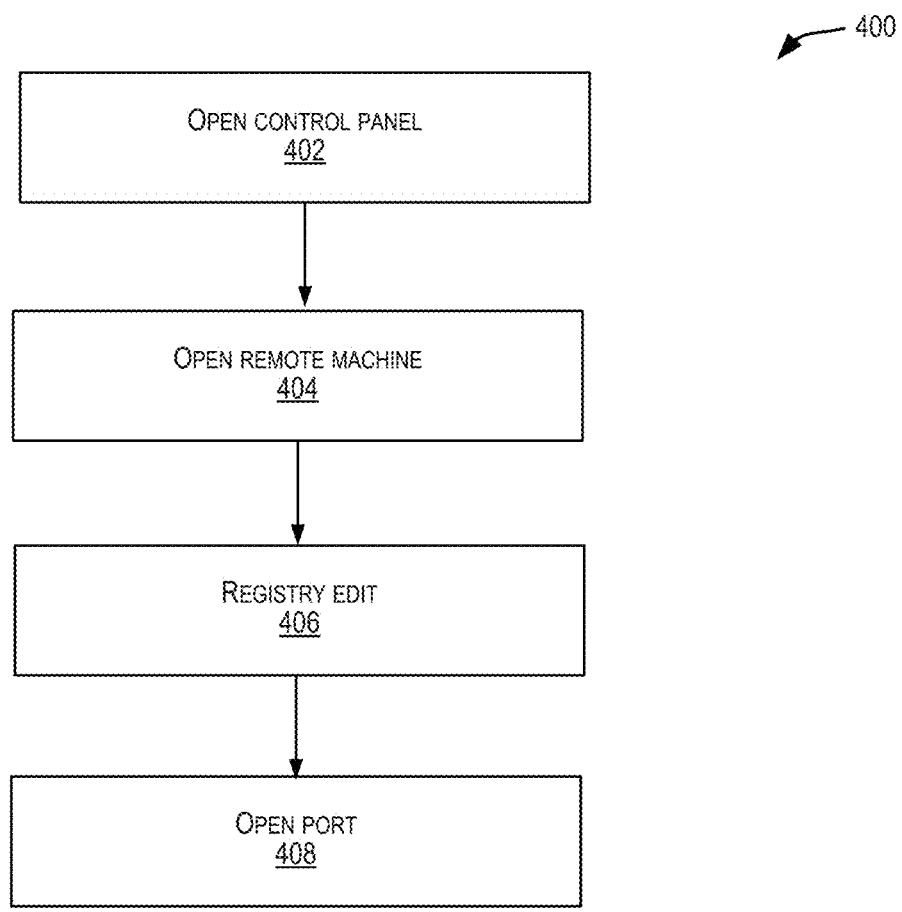
FIG. 4 is an exemplary illustration of an activity pattern 400 generated by the privileged account manager in accordance with an embodiment of the present invention.

In some embodiments, activity pattern generator 308 may be configured to generate an activity pattern for the privileged session based on the captured metadata. In an embodiment, the activity pattern may identify a sequence of or more activities performed by the user during a privileged session. For instance, an activity pattern may include a sequence of activities performed by the user such as: open control panel (identified when a user opens the control panel in client 302 by clicking on the start button and selecting the control panel), open remote machine (identified when a user connects to a remote machine within a communication network), registry edit (identified when a user makes changes to a Windows® Operating System (OS) registry) and open port (identified when a user wishes to detect the open ports in the system). In some embodiments, activity pattern generator 308 may be configured to annotate the identified sequence of one or more activities with the captured metadata. For instance, an activity such as "open port" may be annotated with metadata such as the Internet Protocol (IP) address of the opened port, the port number, the time when the port was opened and so on. An example of an activity pattern generated by activity pattern generator 308 is shown in FIG. 4.

In some embodiments, activity pattern analyzer 310 may be configured to analyze the activity pattern generated by activity pattern generator 308. In an embodiment, the analysis of the activity pattern may include assigning a weight to each activity in the sequence of activities of the activity pattern. In some examples, the weight assigned to an activity may be determined based on the position of its occurrence in the sequence. Thus, each activity may be assigned different weights based on where it occurs in the activity pattern. For instance, an activity such as "registry edit" may be assigned a first weight if it occurs in a first position in the sequence of activities, a second weight if it occurs in a second position, a third weight if it occurs in a third position and so on.

Additionally, in some embodiments, different ranges of weights may be assigned to different activities in an activity pattern. For instance, an activity such as "registry edit," which is typically associated with a relatively lower threat level in an organization may be assigned a set of weights within a first range of weights whereas an activity such as "disable network" may be assigned a different set of weights within a second range of weights. In an example, the weights assigned to an activity may be represented as a numeric value. In some embodiments, the weights assigned to an activity may depend on the threat level associated with the activity. In an example, the threat level associated with an activity may be represented qualitatively (e.g., high, medium, low). For instance, a sensitive activity such as a "disable network" operation performed by a user during a privileged session may be associated with a higher threat level than a less sensitive activity such as an "open control panel" operation performed by the user. Thus, the range of weights and maximum weight assigned to activities in an activity stream may depend on the threat level associated with the activity, in some embodiments.

In some embodiments, the weights assigned to an activity may depend on the threat level associated with the activity as discussed above and its position of occurrence in a sequence of activities. For instance, an activity may assigned a lower weight if it is a less sensitive activity and occurs towards the end of a privileged session and a higher weight if it is a more sensitive activity and occurs during the beginning of the session. FIG. 5 shows an exemplary illustration of a table of weights assigned to different activities of an activity pattern.

After assigning a weight to each activity in the given activity pattern as discussed above, in some embodiments, activity pattern analyzer 310 may be configured to determine an activity pattern from a set of stored activity patterns that most closely matches the given activity pattern. In an embodiment, the activity pattern that most closely matches the given activity pattern may be determined based on identifying the activity pattern that comprises at least a subset or a subsequence of the one or more activities performed by the user during the privileged session. For example, in certain embodiments, the activity pattern that most closely matches the given activity pattern may be determined based on identifying the longest matching subsequence between the sequences of activities (i.e., of the given activity pattern and one or more stored activity patterns) having a maximum matching weight. In one approach, the identification of the longest matching subsequence between two sequences may be solved in a computation time, O(n log n) where n is the sequence length. The manner which a matching activity pattern may be identified is discussed in detail in relation to FIG. 5.

In some embodiments, the set of activity patterns may be stored in a pattern repository 320. In an embodiment, an activity pattern stored in pattern repository 320 may be represented as a tuple with the following structure:

<Rule><Action><Stats>

In some examples, the <Rule> attribute may comprise the sequence of steps (activities) in the activity pattern. For instance, the <Rule> attribute may comprise a sequence of activities such as "open control panel," "open remote machine," "registry edit," and "open port" as discussed above. The <Action> attribute may represent the next step that has to be performed when a <Rule> is matched. For instance, the <Action> attribute may define the next step to be performed by the system and/or by the administrator of the system in relation to the activity pattern. Exemplary actions for an activity pattern may include, "Warn User," "Warn Admin," "Logout User," "Reboot Machine," "Quarantine machine," "Take no action," and the like. The <Stats> attribute may store statistics related to the activity pattern, such as frequency of occurrence of the pattern, pattern cluster membership information, the distance of the pattern from the centroid of a cluster, and the like.

In certain embodiments, groups of similar activity patterns may be combined together into clusters and stored in pattern repository 320. Such groups of similar patterns may be referred to as pattern clusters, in one embodiment. Pattern clusters may be generated automatically by privileged account manager 302 or by an administrator of privileged account manager 302. In an embodiment, pattern clusters may be generated by seeding pattern repository 320 with activity patterns from ongoing sessions and grouping similar activity patterns into clusters. The identification of similar activity patterns can be based on, for example, determining the longest matching subsequence between sequences of activity patterns, as discussed above. In other embodiments, clustering techniques such as K-means clustering which uses a Euclidian distance measure to measure similarity between activity patterns may also be used to generate pattern clusters.

In some examples, each pattern cluster may be associated with one or more parameters such as a cluster centroid, a cluster action and a cluster threat value. As described herein, the cluster centroid represents the mean value of the patterns within a cluster, the cluster action may represent a cumulative action associated with the patterns that comprise a cluster and the cluster threat value may represent a qualitative value such as "high," "medium," or "low" assigned to the pattern cluster. As discussed above, the threat value may be determined based on the sensitivity of an activity in an activity pattern, in some embodiments.

In some instances, a tuple associated with an activity pattern can also be grouped. For example, a tuple can include a <Rule> attribute which in-turn may be a set of activity patterns, typically the acitivity patterns in a particular cluster. This enables assigning a single action to a set of <Rules> in one or more clusters. In some embodiments, a cache of the tuples may be maintained such that it can be used to quickly match patterns and the necessary action can be taken.

In the embodiment depicted in FIG. 3, pattern repository 320 is illustrated as being stored in privileged account manager 302. In other embodiments, pattern repository 312 may be stored in an individual agent 322 in target system 318 or may be stored both in privileged account manager 302 and the agent in target system 318.

Upon finding the matched activity pattern as discussed above, in some embodiments, activity pattern analyzer 310 may then be configured to assign the matched activity pattern to the appropriate pattern cluster. In some examples, the match value may be used as a Euclidian distance measure in a K-means clustering algorithm to add the given activity pattern to the appropriate cluster. Upon adding the activity pattern to the appropriate cluster, activity pattern analyzer 310 may then be configured to update the cluster's centroid (mean) value. Then, activity pattern analyzer 310 may be configured to determine an appropriate action to be taken for the given activity pattern based on the action associated with the matched activity pattern or the cumulative action associated with the matched activity pattern's pattern cluster. In some instances, activity pattern analyzer 310 may be configured to transmit the action to activity visualizer 312.

Figure 6:
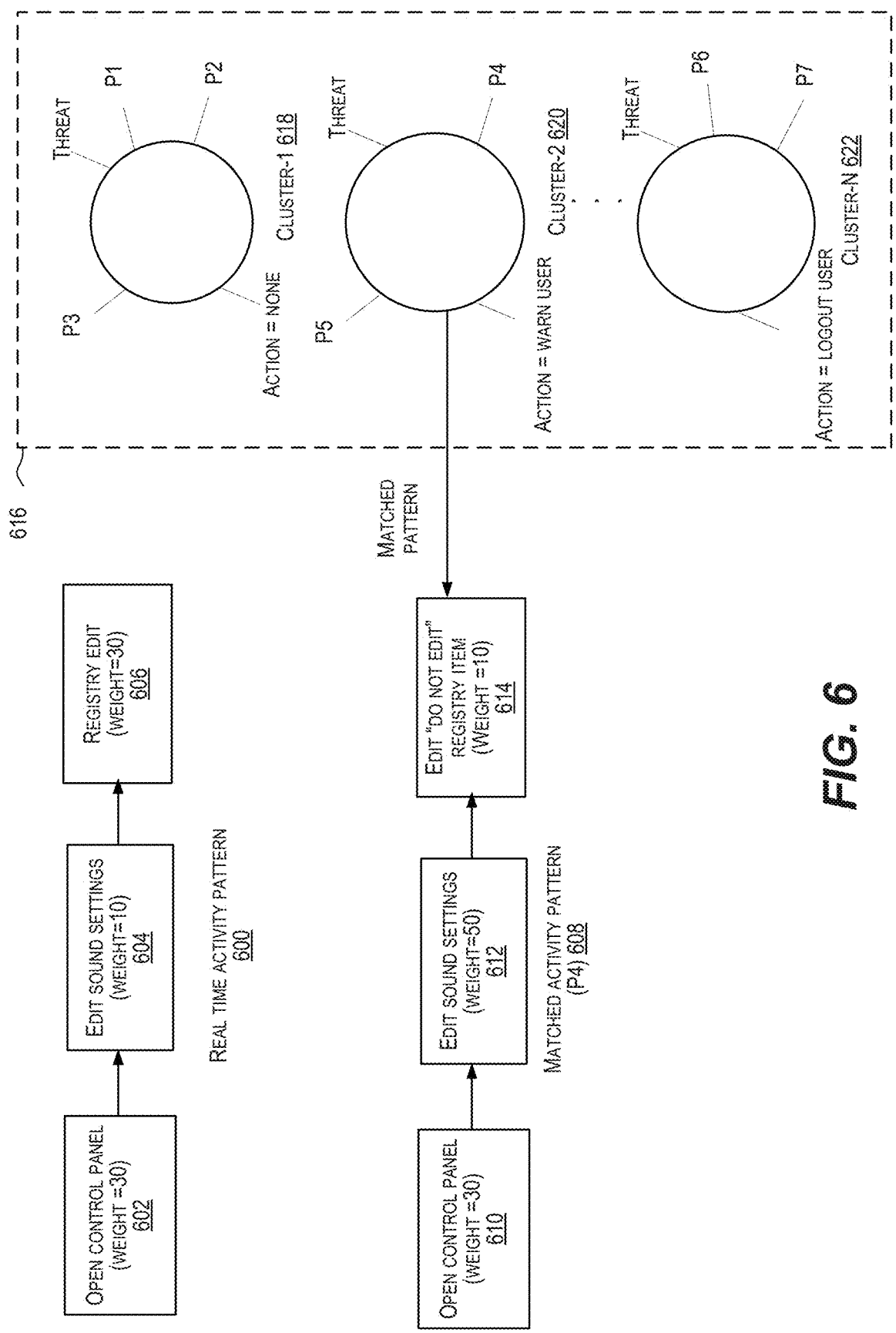
FIG. 6 is an exemplary illustration of the manner in which an activity pattern may be analyzed by the privileged account manager, in accordance with an embodiment of the present invention.

In some examples, an exact match of the given activity pattern with a stored activity pattern from the pattern repository may exist. In this case, for the matched <Rule>, the associated <Action> is performed, and <Stats> attribute of the activity pattern is incremented. FIG. 6 is an exemplary illustration of the manner in which a given activity pattern may be analyzed by activity pattern analyzer 310 of the privileged account manager.

In some embodiments, activity visualizer 312 may be configured to transmit information related to a privileged session to an administrator of client (e.g., 316). For instance, the information may be presented via a browser application on client 316. This information may include, for instance, the generated activity pattern related to an ongoing privileged session, the activity pattern annotated with metadata related to the privileged session, cluster information associated with the activity pattern such as a graphical view of the pattern cluster associated with the activity pattern, the individual patterns that make up the pattern cluster, the cluster centroid and statistics related to the activity pattern such as its frequency of occurrence, and the like.

In some embodiments, activity visualizer 312 may be configured to transmit the appropriate action to be taken for the determined activity pattern to a user and/or administrator on client devices (e.g., 314, 316). As noted above, exemplary actions for an activity pattern may include "Warn User," "Warn Admin," "Logout User," "Reboot Machine," "Quarantine machine," "Take no action," and the like.

In certain embodiments, activity visualizer 312 may be configured to present relevant frames (e.g., frames related to an activity pattern) tied together as a video to a user of client (e.g., 314, 316). For instance, the user may be an administrator of the system, in an embodiment. In some examples, activity visualizer 312 may be configured to add annotations automatically to the video to highlight activities of significance Annotations embedded into the video may pop up during video play, automatically or on mouse over, to display the summary of the reasons for the presence of the annotation. In some examples, activity visualizer 312 may be configured to present frames from different privileged sessions across different machines that are tied to a certain type of activity of interest. For instance, activity visualizer 312 may be configured to consolidate frames across the different privileged sessions and present a single video comprising all the instances of an activity type across sessions for an administrator of the system. Thus, an administrator interested in viewing only registry edits on multiple windows and/or machines can view a consolidated video of registry edits rather than having to view individual video recordings of the different privileged sessions.

FIG. 4 is an exemplary illustration of an activity pattern 400 generated by the privileged account manager in accordance with an embodiment of the present invention. As discussed above, activity pattern 400 is a sequence of one or more activities performed by a user during a privileged session derived from metadata related to the privileged session. For instance, activity pattern 400 may include a sequence of activities performed by the user such as: open control panel 402 (identified when a user opens the control panel by clicking on the start button and selecting the control panel), open remote machine 404 (identified when a user connects to a remote machine within a communication network), registry edit 406 (identified when a user makes changes to a Windows® Operating System (OS) registry) and open port 408 (identified when a user wishes to detect the open ports in the system). In some embodiments, the privileged account manager may be configured to annotate the sequence of activities in activity pattern 400 with the captured metadata. For instance, an activity such as "open port" may be annotated with metadata such as the Internet Protocol (IP) address of the opened port, the port number, the time when the port was opened and so on. The activity pattern depicted in FIG. 4 is one example of an activity pattern generated by the privileged account manager and is not intended to be limiting. For example, there may be a different, more or a fewer sequence of activities than make up an activity pattern than those shown in FIG. 4, in other embodiments.

FIG. 5 shows an exemplary illustration of a table of weights associated with activities of an activity pattern in a privileged session, in accordance with an embodiment of the present invention. In the example shown in FIG. 5, open control panel 500 and disable network 504 depict exemplary activities within an activity sequence of an activity pattern. Table 502 is a table of weights associated with the activity, open control panel 500 and table 506 is a table of weights associated with the activity, disable network 504. As discussed above, in an embodiment, the privileged account manager may perform the analysis of an activity pattern by assigning a weight to each activity in the sequence of activities of the activity pattern. In an embodiment, the privileged account manager may assign a weight to an activity by performing a look up of the appropriate weight to be assigned to the activity based on a table of weights associated with the activity. For instance, for the open control panel activity 500, the privileged account manager may assign a weight of 100 to the activity if the activity occurs in a first position in a sequence of activities in the activity pattern, a weight of 50 if the activity occurs in a second position in the sequence, a weight of 10 if the activity occurs in the 'Nth' position of the sequence by looking up the appropriate weight from table of weights 502 associated with activity 500. In an embodiment, the weights assigned to an activity may be pre-determined by the privileged account manager system or may be manually assigned by an administrator of the system.

In some embodiments, the weights assigned to an activity may depend on the threat level associated with the activity as discussed above and its position of occurrence in a sequence of activities. For instance, as shown in FIG. 5, open control panel activity 500 may be assigned a lower weight if it occurs towards the end of a privileged session and a higher weight if it occurs in the beginning of the session.

In some embodiments, the privileged account manager may assign the same weight to an activity regardless of its position of occurrence in a sequence of activities of an activity stream. For instance, this situation may occur for activities (e.g., "disable network") that have a high threat level, activities that are considered highly sensitive or those activities that have been tagged with a sensitivity tag or score (e.g., an activity that continuously uses high bandwidth). For example, as shown in FIG. 5, a sensitive activity such as "disable network" may be assigned a constant weight of 200 (based on the table of weights 506) regardless of its position in a sequence of activities of an activity pattern. The table of weights 502, 506 depicted in FIG. 5 is one example of weights that may be assigned to activities in an activity pattern is not intended to be limiting. For example, there may be a different, more or a fewer weights assigned to activities of an activity pattern, in other embodiments.

FIG. 6 is an exemplary illustration of the manner in which an activity pattern may be analyzed by the privileged account manager, in accordance with an embodiment of the present invention. As shown, given activity pattern 600 represents an activity pattern generated by the privileged account manager (e.g., 302) based on extracting metadata associated with a privileged session, in real time. Activity pattern 600 may include a sequence of steps, open control panel 602, edit sound settings 604 and registry edit 606, in one example. Additionally, each step in given activity pattern 600 may be assigned a weight, e.g., based on a lookup of table of weights 502, 506 discussed in FIG. 5. For instance, open control panel 602 may be assigned a weight of 30, edit sound settings 604 may be assigned a weight of 10 and registry edit 606 may be assigned a weight of 606.

In some embodiments, the privileged account manager may be configured to determine an activity pattern from a set of stored activity patterns 616 that most closely matches the given activity pattern 600 by analyzing stored activity patterns 616. As discussed above, in some examples, the privileged account manager may be configured to determine the activity pattern that most closely matches the given activity pattern 600 based on identifying the longest matching subsequence between the two sequences (i.e., of the given activity pattern and the stored activity patterns) having a maximum matching weight. For instance, the privileged account manager may determine that stored activity pattern P4 (e.g., with sequence of steps, open control panel 610, edit sound settings 612 and edit "do not edit" registry item 614) most closely matches given activity pattern 600.

In some embodiments, privileged account manager may then be configured to determine if given activity pattern 600 and stored activity pattern P4 have a maximum matching weight. In an embodiment, the maximum matching weight may be determined by adding the individual weights assigned to each activity in given activity pattern 600 and the weights assigned to stored activity pattern P4 and determining if the total weight (e.g., 70) of given activity pattern 600 is within a pre-determined threshold of the total weight of stored activity pattern P4 (e.g., 90). If the privileged account manager determines that given activity pattern 600 and stored activity pattern P4 have a maximum matching weight, then privileged account manager may be configured to determine that P4 is a matched activity pattern 608.

Upon determining matched activity pattern 608, in some embodiments, the privileged account manager may be configured to identify the corresponding pattern cluster (e.g., cluster-2 620) associated with matched activity pattern and assign the given activity pattern (e.g., 600) to appropriate pattern cluster 620. In certain embodiments, the privileged account manager may be configured to determine an action to be taken for the given activity pattern based at least in part on the cumulative action associated with matched pattern cluster 620. For instance, in the example shown in FIG. 6, the privileged account manager may determine that an action, such as "Warn User" associated with matched pattern cluster 620 should be taken for given activity pattern 600. In some embodiments, the privileged account manager may then be configured to transmit the action to an administrator on a client device (e.g., 314).

Figure 7:
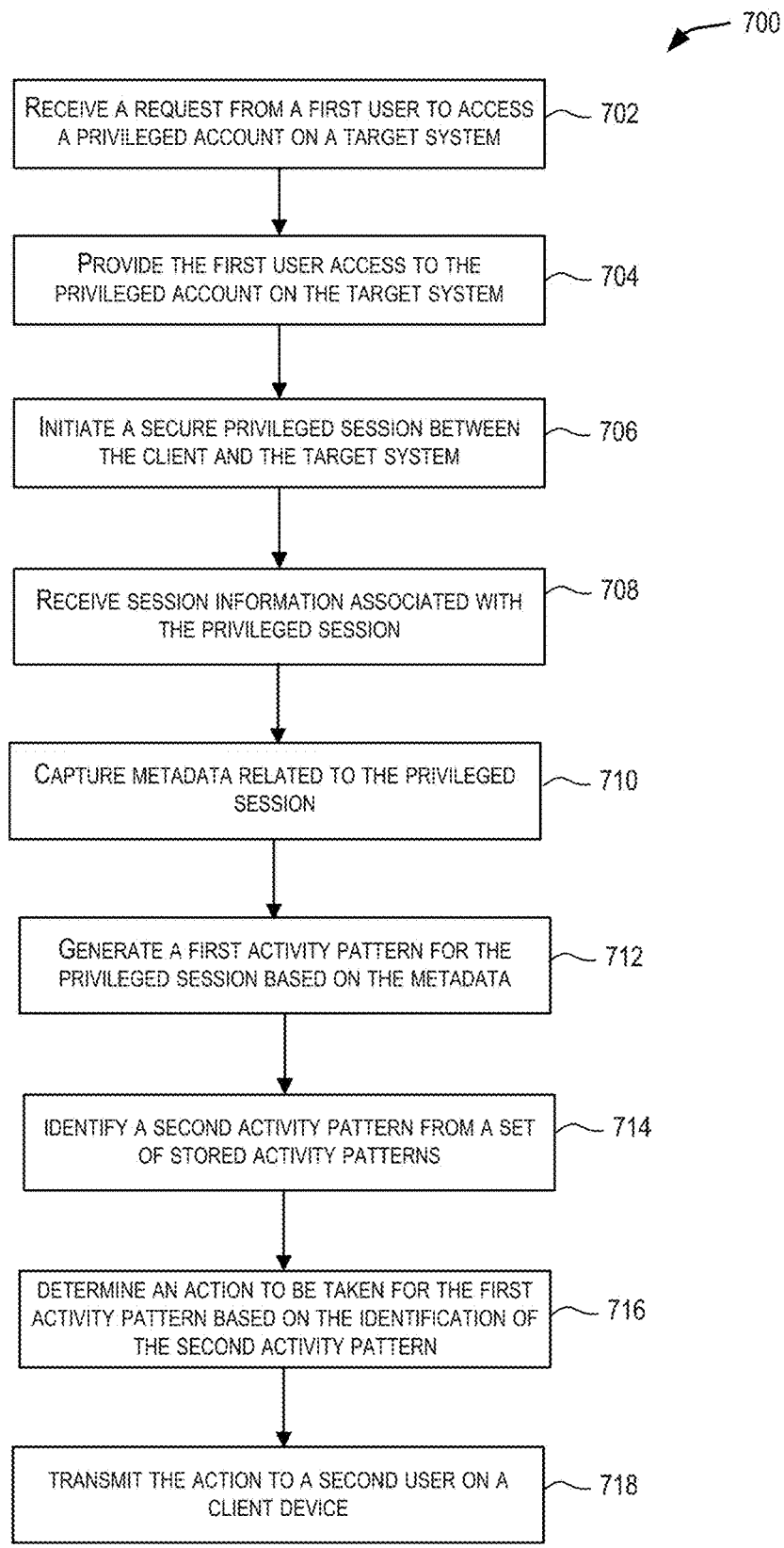
FIG. 7 illustrates a flow diagram of an example process 700 for generating and analyzing activity patterns in accordance with an embodiment of the present invention.
Figure 8:
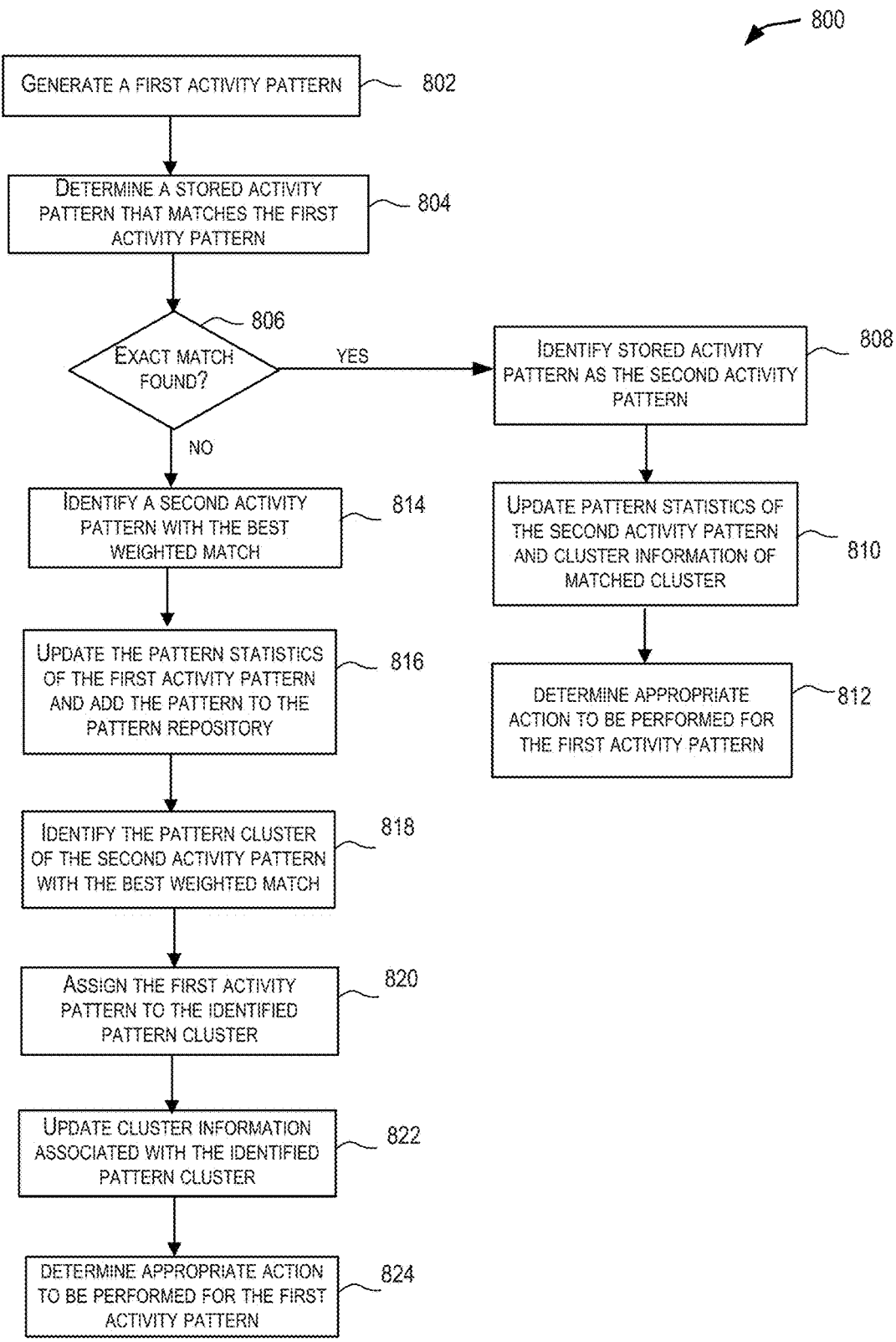
FIG. 8 illustrates a flow diagram of an example process 800 for identifying a matched activity pattern in accordance with an embodiment of the present invention.

FIGS. 7-8 illustrate example flow diagrams showing respective processes 700 and 800 of generating and analyzing activity patterns related to a privileged session, according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the privileged account manager (e.g., utilizing at least account access manager 304, metadata extractor and analyzer 306, activity pattern generator 308, activity pattern analyzer 310 and activity visualizer 312) shown in at least FIG. 3 (and others) may perform the process 700 and 800 of FIGS. 7-8 respectively.

FIG. 7 illustrates a flow diagram of an example process 700 for generating and analyzing activity patterns in accordance with an embodiment of the present invention. The process at 700 may begin at 702 when a request is received by privileged account manager (e.g., 302) from a first user of client (e.g., 314) to access a privileged account on a target system (e.g., 318). For instance, the first user may represent a user entity such as an end-user of an organization or an administrative entity such as an administrator of the organization. At 704, the privileged account manager provides the first user access to the privileged account on the target system. For instance, when a user of client 314 wishes to access target system 318, account access manager 304 of privileged account manager 302 may check out an appropriate password to the user. The user may then utilize the checked out password to log in to the target system. At 706, the privileged account manager may initiate a secure privileged session between the client and the target system.

In some embodiments, at 708, the privileged account manager may receive session information associated with the privileged session. At 710, the privileged account manager may capture metadata related to the privileged session based at least in part on the session information. As noted above, metadata may include, for instance, application, textual, visual and audio data related to a privileged session.

In certain embodiments, at 712, the privileged account manager may generate a first activity pattern for the privileged session based at least in part on the captured metadata. As noted above, the first activity pattern may include a sequence of one or more activities performed by a first user during the privileged session.

At 714, the privileged account manager may identify a second activity pattern from a set of stored activity patterns. In some examples, the second activity pattern may include at least a subset of the one or more activities performed by the first user during the privileged session. The manner in which a second activity pattern is generated by the privileged account manager is discussed in detail in relation to FIG. 8.

In some embodiments, at 716, the privileged account manager may determine an action to be taken for the first activity pattern based at least in part on the identification of the second activity pattern. As noted above, exemplary actions for an activity pattern may include, "Warn User," "Warn Admin," "Logout User," "Reboot Machine," "Quarantine machine," "Take no action," and the like.

At 718, the privileged account manager may transmit the action to a second user on a client device (e.g., 316). In some examples, the second user may be an administrator of the organization. In some examples, at 718, the privileged account manager may transmit information related to a privileged session to the administrator. For instance, the information may be presented via a browser application on client device 316. This information may include, for instance, an activity pattern related to an ongoing privileged session, an activity pattern that is annotated with metadata related to the privileged session, cluster information associated with the activity pattern such as a graphical view of the pattern cluster associated with the activity pattern, the individual patterns that make up the pattern cluster, the cluster centroid and statistics related to the activity pattern such as its frequency of occurrence, and the like.

FIG. 8 illustrates a flow diagram of an example process 800 for identifying a matched activity pattern in accordance with an embodiment of the present invention. The process at 800 may begin at 802 when a first activity pattern is generated by the privileged account manager. At 804, the privileged account manager determines a stored activity pattern that matches the first activity pattern. As noted above, an activity pattern that most closely matches the first activity pattern may be determined based on identifying an activity pattern from the stored set of activity patterns (i.e., in pattern repository 320) that comprises at least a subset or a subsequence of the one or more activities performed by the user during the privileged session. For instance, in certain embodiments, the activity pattern that matches the first activity pattern may be determined by identifying the longest matching subsequence between the sequences of activities (i.e., of the first activity pattern and the one or more stored activity patterns) having a maximum matching weight.

In some embodiments, at 806, the privileged account manager determines if an exact match of a stored activity pattern with the first activity pattern is found. If an exact match is found, then, at 808, the privileged account manager identifies the stored activity pattern as the second activity pattern. At 810, the privileged account manager updates the pattern statistics of the second activity pattern and the pattern cluster information associated with the second activity pattern. For instance, the privileged account manager may update the frequency of occurrence of the second activity pattern (e.g., by updating the <Stats> attribute in the tuple representing the second activity pattern), the pattern cluster membership information associated with the second activity pattern (i.e., the particular pattern cluster that the second activity pattern is assigned to), the centroid (mean value) of the cluster, and the like.

At 812, the privileged account manager may determine the appropriate action to be performed for the first activity pattern. For instance, the appropriate action to be performed may be determined based on identifying the <Action> value in the tuple representing the second activity pattern. In some embodiments, the appropriate action to be performed may also be determined by identifying the cumulative action associated with the matched pattern cluster of the second activity pattern.

In certain embodiments, at 806, if the privileged account manager determines that an exact match of a stored activity pattern with the first activity pattern is not found, then, at 814, the privileged account manager identifies a second activity pattern from the stored activity patterns that has the best weighted match. In some examples, as noted above, the second activity pattern with the best weighted match may be determined by identifying the longest matching subsequence between the sequences of activities (i.e., of the first activity pattern and the one or more stored activity patterns) having a maximum matching weight. At 816, the privileged account manager may update the pattern statistics of the first activity pattern. For instance, the privileged account manager may update the frequency of occurrence of the first activity pattern in the <Stats> attribute of the tuple representing the first activity pattern. In some examples, at 816, the privileged account manager may add the first activity pattern to the pattern repository (e.g., 320).

In some embodiments, at 818, the privileged account manager identify the pattern cluster associated with the second activity pattern. At 820, the privileged account manager may assign or add the first activity pattern to the identified pattern cluster. At 822, the privileged account manager may update the cluster information associated with the identified pattern cluster (e.g., centroid (mean value) of the cluster). At 824, the privileged account manager may determine the appropriate action to be performed for the first activity pattern. For instance, as noted above, the appropriate action to be performed may be determined based on identifying the <Action> value in the tuple representing the second activity pattern or by identifying the cumulative action of the identified pattern cluster associated with the first activity pattern.

Figure 9:
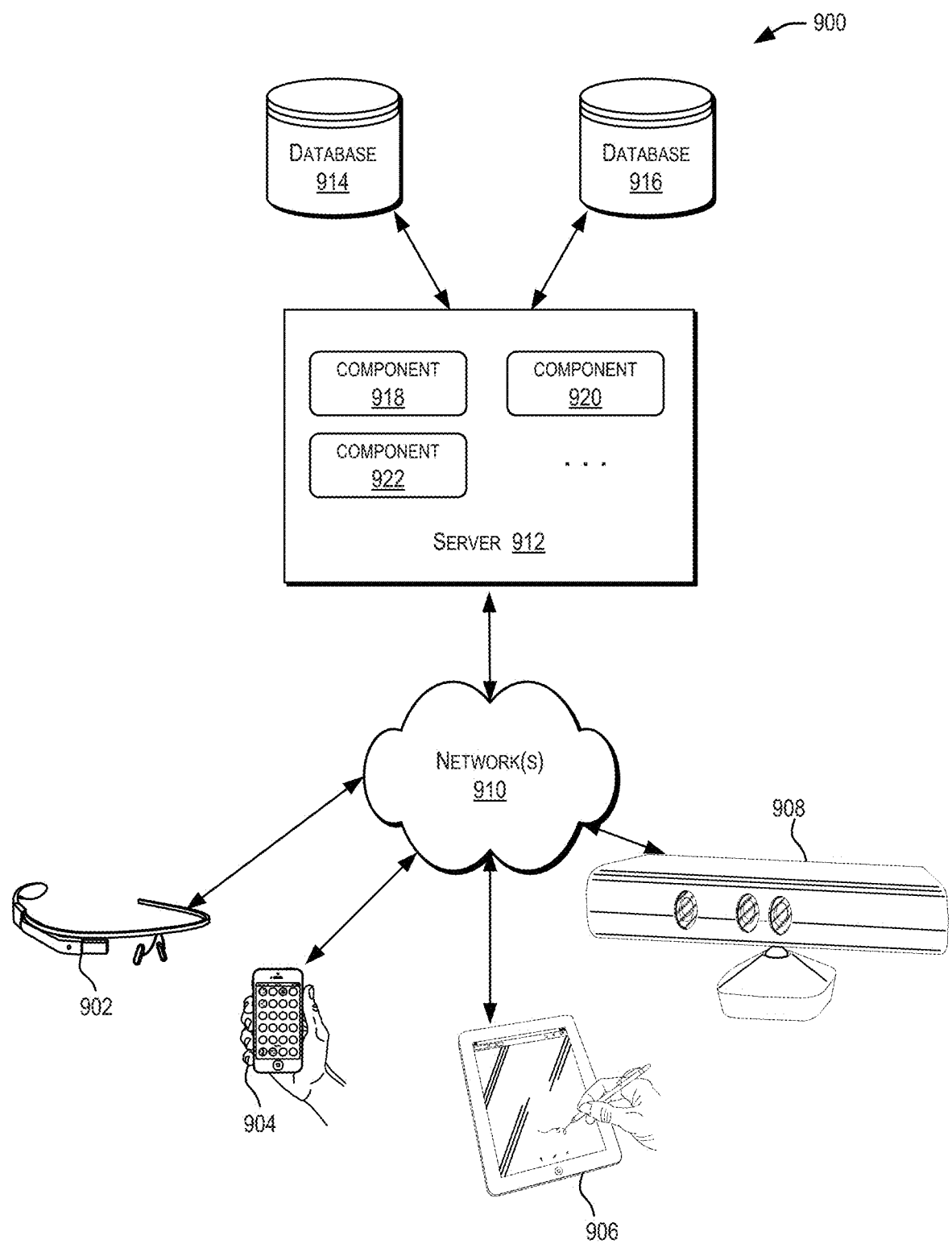
FIG. 9 depicts a simplified diagram of a distributed system 900 for implementing an embodiment of the present disclosure.
Figure 10:
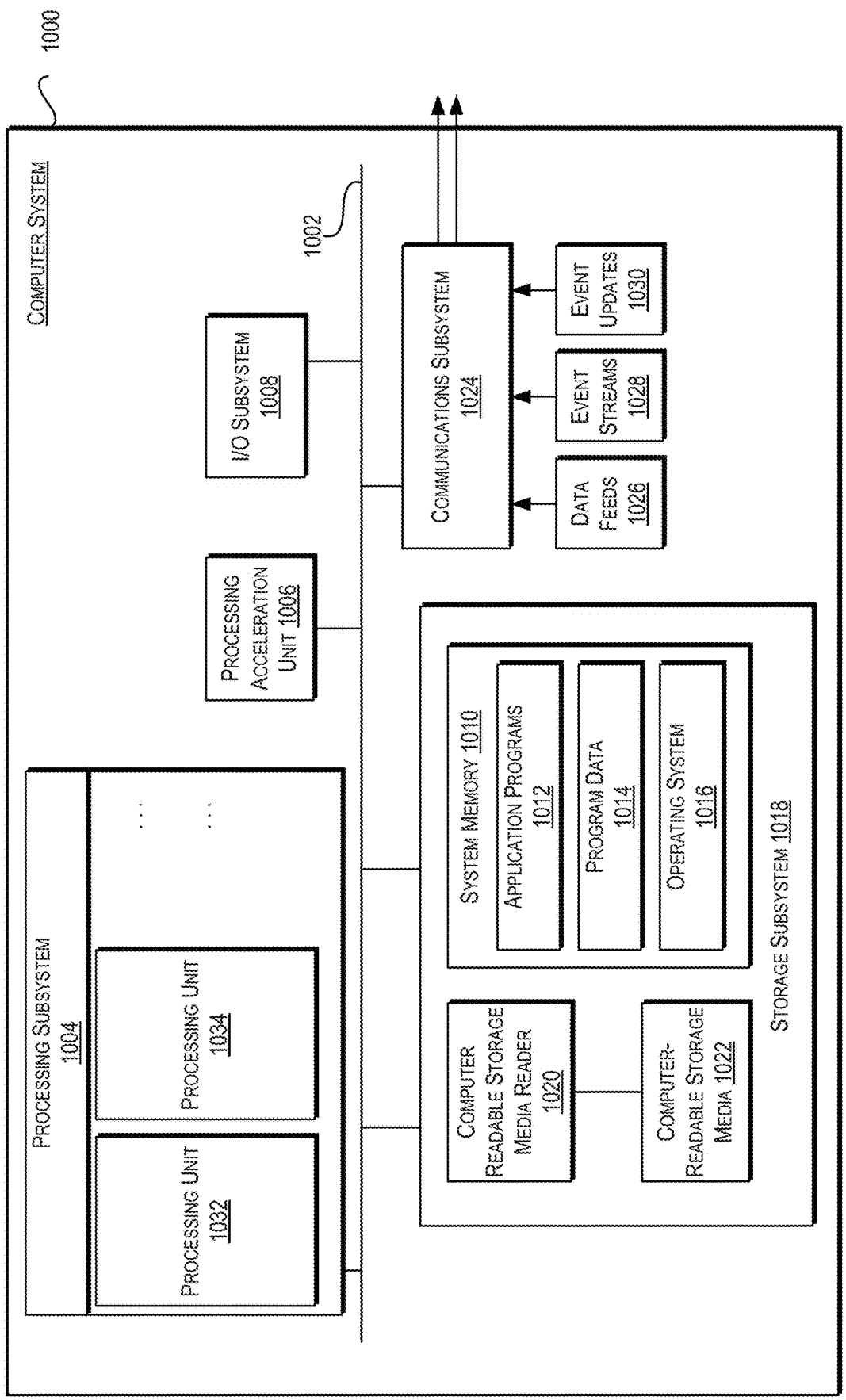
FIG. 10 illustrates an exemplary computer system 1000 that may be used to implement an embodiment of the present invention.

FIGS. 9-10 illustrate aspects of example environments for implementing aspects of the present invention in accordance with various embodiments. FIG. 9 depicts a simplified diagram of a distributed system 900 for implementing an embodiment of the present disclosure. In the illustrated embodiment, the distributed system 900 includes one or more client computing devices 902, 904, 906, and 908, which are configured to execute and operate a client application such as a web browser, proprietary client (e.g., Oracle Forms), or the like over one or more network(s) 910. The server 912 may be communicatively coupled with the remote client computing devices 902, 904, 906, and 908 via network 910.

In various embodiments, the server 912 may be adapted to run one or more services or software applications such as services and applications that provide identity management services. In certain embodiments, the server 912 may also provide other services or software applications can include non-virtual and virtual environments. In some embodiments, these services may be offered as web-based or cloud services or under a Software as a Service (SaaS) model to the users of the client computing devices 902, 904, 906, and/or 908. Users operating the client computing devices 902, 904, 906, and/or 908 may in turn utilize one or more client applications to interact with the server 912 to utilize the services provided by these components.

In the configuration depicted in FIG. 9, the software components 918, 920 and 922 of system 900 are shown as being implemented on the server 912. In other embodiments, one or more of the components of the system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in FIG. 9 is thus one example of a distributed system for implementing an embodiment system and is not intended to be limiting.

The client computing devices 902, 904, 906, and/or 908 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox® gaming console with or without a Kinect® gesture input device), and/or a personal messaging device, capable of communicating over the network(s) 910.

Although distributed system 900 in FIG. 9 is shown with four client computing devices, any number of client computing devices may be supported. Other devices, such as devices with sensors, etc., may interact with the server 912.

The network(s) 910 in the distributed system 900 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 910 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 912 can include one or more virtual machines running virtual operating systems, or other computing architectures involving virtualization. One or more flexible pools of logical storage devices can be virtualized to maintain virtual storage devices for the server. Virtual networks can be controlled by the server 912 using software defined networking. In various embodiments, the server 912 may be adapted to run one or more services or software applications described in the foregoing disclosure. For example, the server 912 may correspond to a server for performing processing as described above according to an embodiment of the present disclosure.

The server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 912 may include one or more applications to analyze and consolidate data feeds and/or event updates received from users of the client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 912 may also include one or more applications to display the data feeds and/or real-time events via one or more display devices of the client computing devices 902, 904, 906, and 908.

The distributed system 900 may also include one or more databases 914 and 916. These databases may provide a mechanism for storing information such as user identity information, and other information used by embodiments of the present invention. Databases 914 and 916 may reside in a variety of locations. By way of example, one or more of databases 914 and 916 may reside on a non-transitory storage medium local to (and/or resident in) the server 912. Alternatively, the databases 914 and 916 may be remote from the server 912 and in communication with the server 912 via a network-based or dedicated connection. In one set of embodiments, the databases 914 and 916 may reside in a storage-area network (SAN). Similarly, any necessary files for performing the functions attributed to the server 912 may be stored locally on the server 912 and/or remotely, as appropriate. In one set of embodiments, the databases 914 and 916 may include relational databases, such as databases provided by Oracle, that are adapted to store, update, and retrieve data in response to SQL-formatted commands.

FIG. 10 illustrates an exemplary computer system 1000 that may be used to implement an embodiment of the present invention. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for dynamically modifying documents (e.g., webpages) responsive to usage patterns.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices. Additionally, communication subsystem 1024 may be used to communicate notifications of successful logins or notifications to re-enter a password from the privileged account manager to the requesting users.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system comprising:
a processor; and
a memory device including instructions that, when executed by the processor, cause the processor to:
responsive to a first user requesting access from a first client device to a privileged account on a target system, send, to the first client device, access information to enable the first user using the first client device to access the privileged account;
based on the first client device accessing the privileged account using the access information, send, to the target system, a request to establish a session between the first client device and the target system;
receive, from the target system, metadata captured by the target system, wherein the metadata is indicative of activity performed by the first user operating the first client device during the session with the target system;
determine a first activity pattern for the session based on the metadata, the first activity pattern comprising a sequence of activities performed by the first user during the session, wherein each activity in the sequence of activities is associated with an activity weight, and wherein an activity weight associated with an activity in the sequence of activities is based on a position of the activity in the sequence of activities;
determine, based on each activity weight of each activity in the sequence of activities, a first total weight;
identify, based at least on a first subsequence of the first activity pattern, a second activity pattern comprising a second subsequence that corresponds to the first subsequence of the first activity pattern, the second activity pattern having a second total weight;
compare the first total weight to the second total weight to determine that the second total weight is within a pre-determined threshold of the first total weight;
in response to determining that the second total weight is within the pre-determined threshold of the first total weight, determine an action to be performed for the first activity pattern; and
transmit the action to a second client device, wherein the action is an action to be performed for the session.

2. The system of claim 1, wherein the instructions, when executed by the processor, further cause the processor to:
determine a weight to be assigned to a particular activity of the sequence of activities performed by the first user during the session.

3. The system of claim 1, wherein the weight is determined based on a threat level associated with the activity.

4. The system of claim 1, wherein determining that the second activity pattern is a match for the first activity pattern includes:
identifying a longest matching subsequence between activities included in a sequence in the first activity pattern and activities included in the second activity pattern.

5. The system of claim 1, wherein the metadata comprises at least one of application information, system information, network activity information, textual information, visual information and audio information, related to the session.

6. The system of claim 1, wherein the instructions, when executed by the processor, further cause the processor to:
transmit information related to the first activity pattern to the second client device.

7. The system of claim 1, wherein the second activity pattern is identified by comparing one or more activities included in the first activity pattern with one or more activities in each stored activity pattern of the set of stored activity patterns.

8. The system of claim 1, where the action includes an action to modify the session or an action to issue a notification.

9. The system of claim 1, wherein the activity weight associated with the activity is within a range, wherein the range is based at least on a threat level associated with the activity.

10. A computer-implemented method comprising:
responsive to a first user requesting access from a first client device to a privileged account on a target system, sending, to the first client device, access information to enable the first user using the first client device to access the privileged account;
based on the first client device accessing the privileged account using the access information, sending, to the target system, a request to establish a session between the first client device and the target system;
receiving, from the target system, metadata captured by the target system, wherein the metadata is indicative of activity performed by the first user operating the first client device during the session with the target system;
determining a first activity pattern for the session based on the metadata, the first activity pattern comprising a sequence of activities performed by the first user during the session, wherein each activity in the sequence of activities is associated with an activity weight, and wherein an activity weight associated with an activity in the sequence of activities is based on a position of the activity in the sequence of activities;
determining, based on each activity weight of each activity in the sequence of activities, a first total weight;
identifying, based at least on a first sub sequence of the first activity pattern, a second activity pattern comprising a second sub sequence that corresponds to the first sub sequence of the first activity pattern, the second activity pattern having a second total weight;
comparing the first total weight to the second total weight to determine the second total weight is within a pre-determined threshold of the first total weight;
in response to determining the second total weight is within the pre-determined threshold of the first total weight, determining an action to be performed for the first activity pattern; and
transmitting the action to a second client device, wherein the action is an action to be performed for the session.

11. The computer-implemented method of claim 10, further comprising:
determining a weight to be assigned to a particular activity of the sequence of activities performed by the first user during the session.

12. The computer-implemented method of claim 10, wherein determining that the second activity pattern is a match for the first activity pattern includes:
identifying a longest matching subsequence between activities included in the sequence in the first activity pattern and activities included in the second activity pattern.

13. The computer-implemented method of claim 10, wherein the metadata comprises at least one of application information, system information, network activity information, textual information, visual information and audio information, related to the session.

14. The computer-implemented method of claim 10 further comprising:
transmitting information related to the first activity pattern to the second client device.

15. The computer-implemented method of claim 10, wherein the activity weight associated with the activity is within a range, wherein the range is based at least on a threat level associated with the activity.

16. A non-transitory computer-readable media storing computer-executable instructions executable by one or more processors, the computer-executable instructions comprising:
instructions that, in response to a first user requesting access from a first client device to a privileged account on a target system, send, to the first client device, access information to enable the first user using the first client device to access the privileged account;
instructions that, based on the first client device accessing the privileged account using the access information, cause the one or more processors to send, to the target system, a request to establish a session between the first client device and the target system;
instructions that cause the one or more processors to receive, from the target system, metadata captured by the target system, wherein the metadata is indicative of activity performed by the first user operating the first client device during the session with the target system;
instructions that cause the one or more processors to determine a first activity pattern for the session based on the metadata, the first activity pattern comprising a sequence of activities performed by the first user during the session, wherein each activity in the sequence of activities is associated with an activity weight, and wherein an activity weight associated with an activity in the sequence of activities is based on a position of the activity in the sequence of activities;
instructions that cause the one or more processors to determine, based on each activity weight of each activity in the sequence of activities, a first total weight;
instructions that cause the one or more processors to identify, based at least on a first sub sequence of the first activity pattern, a second activity pattern comprising a second sub sequence that corresponds to the first sub sequence of the first activity pattern, wherein the second activity pattern having a second total weight;
instructions that cause the one or more processors to compare the first total weight to the second total weight to determine the second total weight is within a pre-determined threshold of the first total weight;
in response to determining the second total weight is within the pre-determined threshold of the first total weight, instructions that cause the one or more processors to determine an action to be performed for the first activity pattern; and
instructions that cause the one or more processors to transmit the action to a second client device, wherein the action is an action to be performed for the session.

17. The non-transitory computer-readable media of claim 16, wherein the computer-executable instructions further comprise:
instructions that cause the one or more processors to determine a weight to be assigned to an activity of the sequence of activities performed by the first user during the session, and wherein the weight is determined based on a threat level associated with the activity.

18. The non-transitory computer-readable media of claim 16, wherein the computer-executable instructions further comprise:

instructions that cause the one or more processors to determine a weight to be assigned to a particular activity of the sequence of activities based on a position of an occurrence of the activity in the sequence of activities in the first activity pattern.

19. The non-transitory computer-readable media of claim 16, wherein the computer-executable instructions further comprise:

instructions for determining that the second activity pattern is a match for the first activity pattern, wherein the instructions that cause the one or more processors to identify a longest matching subsequence between activities included in the sequence in the first activity pattern and activities included in the second activity pattern.

20. The non-transitory computer-readable media of claim 16, wherein the metadata comprises at least one of application information, system information, network activity information, textual information, visual information and audio information, related to the session.

\* \* \* \* \*